Figure 4:
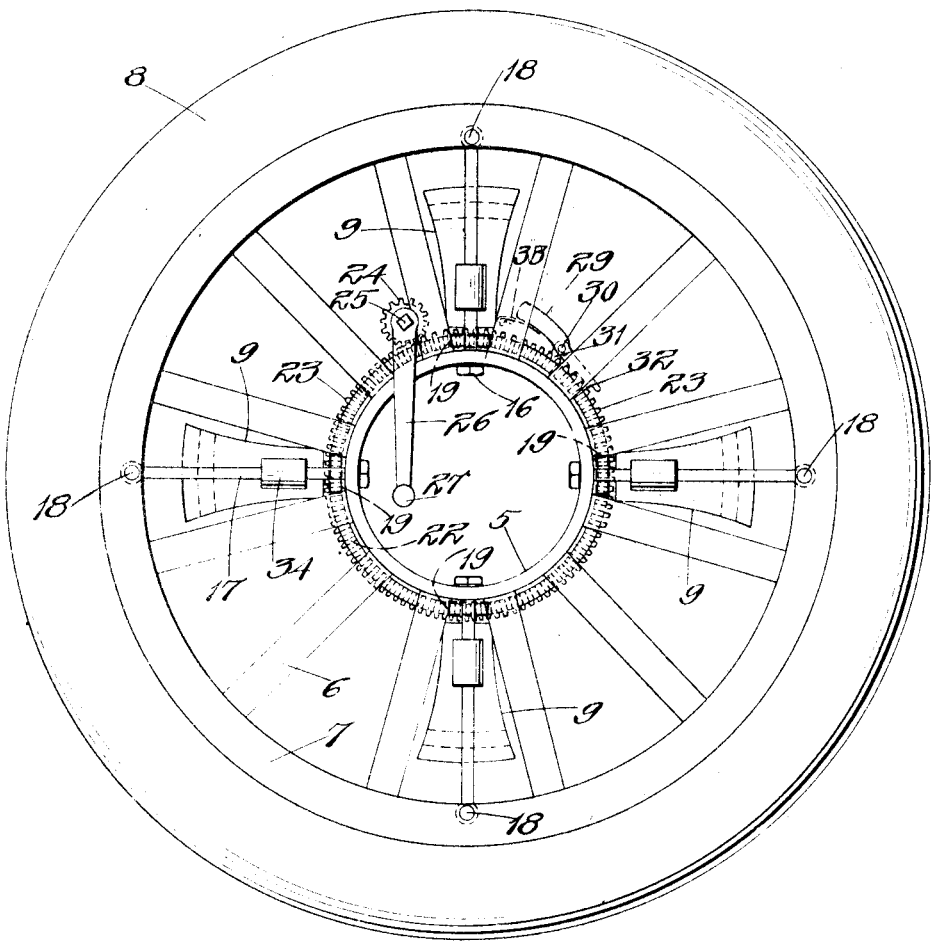

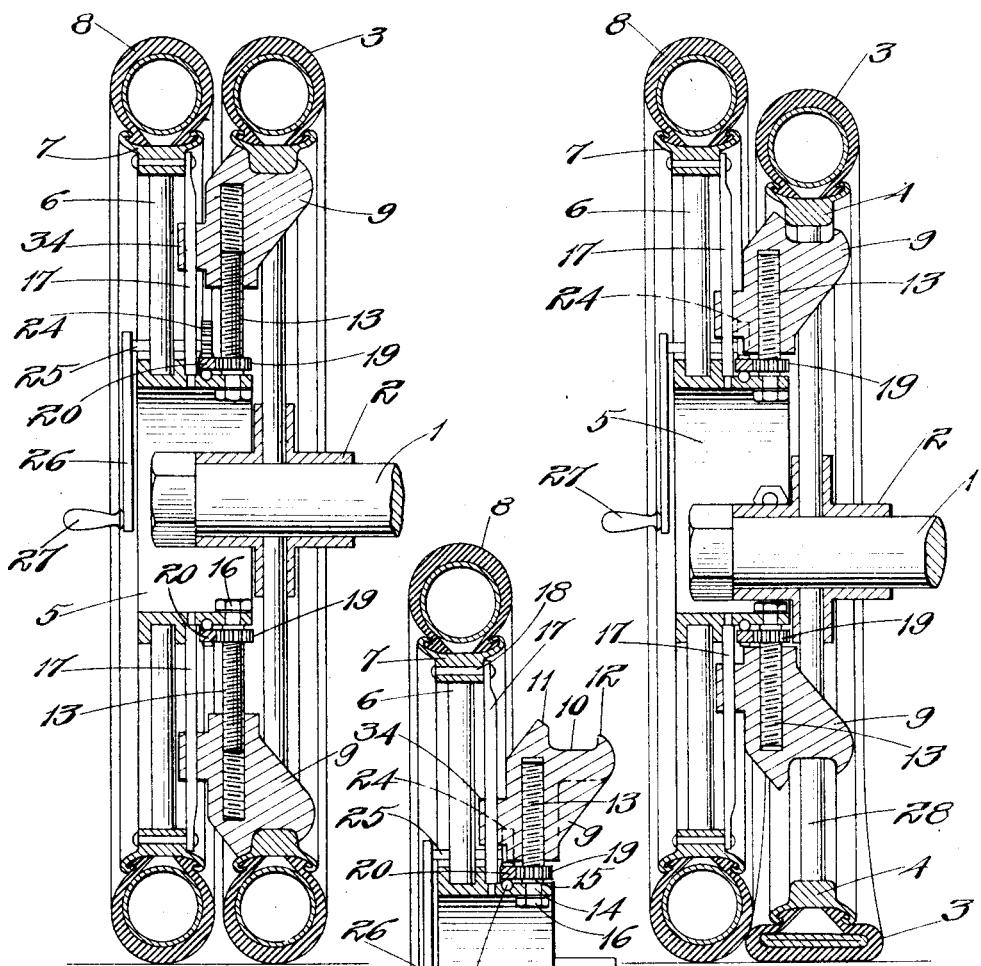

UNITED STATES PATENT OFFICE.

WILLIAM J. NOONAN, OF MANSFIELD, MASSACHUSETTS.

SUPPLEMENTAL OR EMERGENCY WHEEL FOR AUTOMOBILES OR THE LIKE.

1,183,106.    Specification of Letters Patent.    Patented May 16, 1916.

Application filed September 24, 1915. Serial No. 52,508.

*To all whom it may concern:*

Be it known that I, WILLIAM J. NOONAN, a citizen of the United States, residing at Mansfield, county of Bristol, State of Massachusetts, have invented a certain new and useful Improvement in Supplemental or Emergency Wheels for Automobiles or the like, of which the following is a specification, reference being had therein to the accompanying drawings.

The object of the invention is to provide a supplemental or emergency wheel which may be carried by the automobile in the ordinary way of a spare wheel when not in use, and which in case of puncture of the pneumatic tire of one of the ordinary wheels may be readily attached to said punctured wheel and serve in lieu thereof for the time being and without the necessity of removing the disabled wheel or the use of a jack to attach the emergency wheel.

The invention will be fully understood when taken in connection with the accompanying drawings and the novel features thereof will be pointed out and clearly defined in the claims at the close of this specification.

In the drawings,—Figure 1 is a sectional view showing the wheel embodying the invention. Fig. 2 is a sectional view showing the wheel embodying the invention in the position in which it is placed when about to be attached to a motor wheel of which the tire has been deflated. Fig. 3 is a sectional view showing the emergency wheel fully clamped to the motor wheel and ready for use. Fig. 4 is a side elevation of the emergency wheel.

Referring now to the drawings, 1 represents the axle and 2 the hub of an ordinary motor car wheel having the tire 3, which is represented in Fig. 2 as deflated and resting on the ground, thus flattening out the tire on the lower side against the rim 4. The device embodying the invention, as shown in detail in Fig. 1, is formed with a central hub or drum 5 of considerably larger diameter than the hub of the ordinary wheel and is made hollow with open ends. From this drum radiate the spokes 6 on which is mounted a rim 7 carrying a tire 8 which may be an ordinary pneumatic tire of the same size as the tires on the other wheels of the vehicle. The drum 5 is open at the ends and is of sufficient interior diameter so that when the deflated tire 3 of the disabled wheel is resting on the ground and the emergency wheel is to be attached and is also placed on the ground in proximity to it as shown in Fig. 2, the hub 2 of the disabled wheel may be entered into the open end of the emergency wheel but will be eccentric with the said drum 5 as shown in Fig. 2.

A plurality of shoes 9, as I term them, are adjustably and movably mounted at intervals around the periphery of the drum 5, said shoes each being bifurcated or formed with a recess 10 between two horns 11 and 12, the width of the recess being equal to the width of the rim 4 of the regular wheel so that by properly adjusting the said shoes with relation to the axis of the drum, and then actuating the shoes by suitable mechanism, the said shoes may be clamped up against the rim 4 so as to form a seat therefor with the horns 11 and 12 of the shoe embracing the two opposite sides of the rim. Preferably there are four of these shoes arranged at regular intervals apart around the drum, but the exact number is immaterial.

Any suitable mechanism may be provided for actuating the shoes. The preferred mechanism is as follows: Each of said shoes 9 is mounted by means of a screw bolt 13 which is radially mounted or journaled in the periphery of the drum 5, the means shown for thus mounting the said screw bolt being to form the lower end with the reduced portion 14 which passes loosely through a perforation in the periphery of the drum so that it is free to rotate therein, an annular shoulder 15 which bears against the face of the periphery of the drum and a nut 16 on the inner end of the bolt to prevent the bolt from falling out. A guide rod 17 is at one end stepped in the periphery of the drum 5 and passes loosely through an aperture in an ear 34 on the shoe 9 and is at the other end secured by a pin 18 to a rim 7 of the emergency wheel. This guide 17 allows the shoe 9 to be moved radially with relation to the drum toward and away from its periphery and guides it in its movement. The bolt 13 is threaded loosely into the tapped out aperture in the shoe. By rotating the bolt 13, inasmuch as the bolt itself cannot move in or out, being prevented therefrom by the shoulder 15 and the nut 16, the shoe 9 will be moved radially toward or from the drum as the case may be according to which way the bolt is turned.

When the parts are originally assembled the shoes should all be adjusted so as to be equally distant from the axis of the drum and thus no adjustment is required at the time of emergency use.

Mounted on the stem of the bolt 13 above the shoulder 15 is a pinion 19. Journaled on the drum 5 is a large annular gear ring 20, preferably mounted on ball bearings 21. Said gear ring 20 has crown teeth 22 which engage with the teeth of the pinion 19 and has spur teeth 23 which engage with the teeth of a pinion 24 mounted on the crank shaft 25 operated by a crank arm 26 by means of a handle 27. It is thus obvious that by turning the crank 26 the pinion 24 will cause the large gear 20 to revolve, thereby revolving the pinion 19 and turning the screw bolt 13. Said large gear ring 20 engages with all four pinions 19 which are respectively connected with the several bolts 13 and all of said bolts 13 will simultaneously move radially with relation to the drum and longitudinally inward or outward as the case may be.

In case it is desired to apply the emergency wheel when the regular wheel has become disabled as previously described, the crank 26 will be turned to bring the shoes 9 all well toward the center. The emergency wheel will then be placed against the outer side of the disabled wheel as shown in Fig. 2 so that the hub 2 of the disabled wheel will enter into the chamber of the drum 5, the tires of both wheels resting then on the ground as shown in Fig. 2. The shoes 9 are sufficiently thin so that they will pass between two adjacent spokes 28 of the disabled wheel and said shoes are sufficiently off-set from the emergency wheel so that when thus brought into position the recess 10 of the fork of each shoe will be in radial alinement with the rim 4 of the regular wheel. The crank 26 will then be turned in a direction to move the shoes radially outward. As soon as the shoes have moved far enough so that the uppermost shoe begins to engage with the rim of the regular wheel, the continued movement of the crank and radial outward movement of the shoe will lift the rim 4 of the disabled wheel until each one of the other shoes also engages with the rim 4 of the regular wheel. It is obvious from Fig. 2 that the uppermost shoe will begin to engage with the rim 4 before any one of the other shoes engages with the rim because while the regular wheel is in its deflated condition and resting on the ground its axis is below the axis of the emergency wheel and the uppermost wheel is nearer to the rim to start with than any of the other shoes. As soon as the uppermost shoe engages with the rim of the defective tire, the continued upward movement of the shoe will lift the disabled wheel until it is centered with the emergency wheel and all of the shoes are in engagement with the rim of the disabled wheel. As soon as all of the shoes have become tightly engaged with the rim of the regular wheel and the said wheel is lifted into central position as shown in Fig. 3, there can be no further movement of the shoes and the crank cannot be further turned. When the disabled wheel is lifted, the deflated tire will naturally become somewhat rounded out again as shown in Fig. 3, owing to its natural resiliency after the weight has been lifted to relieve the downward pressure.

Means are provided to lock the large gear wheel so that it cannot turn backward while the emergency wheel is in use. Any suitable means may be provided. The means shown consists of a dog 29 pivoted at 30 to a post 31, mounted on the drum 5 and having teeth 32, one or more as desired, which engage with the spur teeth 23 of the large gear wheel 20, being held in such engagement by a spring 33. These teeth of the dog will ride over the gear teeth while the crank is turning the gear wheel to set up the emergency wheel, but will prevent backward rotation. When it is desired to turn the gear wheel backward to release the emergency wheel the heel of the dog may be depressed by hand against the pressure of the spring 33 so as to lift the teeth of the dog out of engagement with the gear teeth. The emergency wheel when thus secured to the disabled wheel is firmly held in place, as shown in Fig. 3, and both the disabled wheel and the emergency wheel will revolve together on the same axle 1.

As the shoes will all be adjusted concentrically with the axis of the drum when the emergency wheel is originally assembled, all that the operator has to do when he has occasion to use the wheel is to place it in the proper position with relation to the disabled wheel and then turn the crank until the shoes are all clamped against the rim of the disabled wheel. Thus the crank and shoes obviate the necessity of any separate lifting jack.

While I have described somewhat in detail the method of construction shown in the drawings by which the shoes 9 are moved radially inward and outward, it is obvious that the means for doing this may be varied without departing from the spirit of the invention. Any suitable gearing or driving connection may be employed whereby through the rotation of the crank shaft the shoes may be moved radially outward to engage the rim of the disabled wheel and lift it so that it will be centered with relation to the emergency wheel and be thus held so that the weight will come on the emergency wheel which will thereupon serve in place of the disabled wheel.

Preferably the crank arm 26 is removable from the shaft 25 so that it may be taken off after the emergency wheel is set up.

What I claim is:

1. An emergency wheel for a motor vehicle having a central drum of larger diameter than the hub of the regular wheel of the vehicle, a plurality of movable shoes disposed outside of the periphery of said drum, screw bolts journaled in the periphery of said drum and having threaded portions which engage with threaded apertures in said shoes, means for rotating said screw bolts within their apertures in said shoes, and means for retaining said bolts against radial movement with relation to the drum while they are being rotated whereby said shoes are moved radially outward into clamping engagement with the rim of the assisted wheel.

2. An emergency wheel for a motor vehicle having a central drum of larger interior diameter than the hub of the regular wheel of the vehicle, a plurality of screw bolts journaled in the periphery of said drum and extending radially outward therefrom, means for simultaneously rotating said screw bolts on their axes, means for preventing said screw bolts from longitudinal movement while they are being rotated, a shoe mounted on each one of said screw bolts having a screw threaded aperture with which said bolt engages whereby the rotation of said screw bolts will cause the radial movement of said shoes with relation to said drum, guides for said shoes, said shoes being off-set from the plane of said emergency wheel and being adapted to engage the rim of an assisted wheel by telescoping the drum of the emergency wheel over the hub of the assisted wheel and operating mechanism for actuating the said shoes in an outward radial direction from the drum.

3. An emergency wheel for a motor vehicle having a central drum of larger interior diameter than the hub of the regular wheel of the vehicle, a plurality of screw bolts journaled in the periphery of said drum and extending radially outward therefrom, means for simultaneously rotating said screw bolts on their axes, means for preventing said screw bolts from longitudinal movement while they are being rotated, a shoe mounted on each one of said screw bolts having a screw threaded aperture with which said bolt engages whereby the rotation of said screw bolts will cause the radial movement of said shoes with relation to said drum, guides for said shoes, said shoes being off-set from the plane of said emergency wheel and being adapted to engage the rim of an assisted wheel by telescoping the drum of the emergency wheel over the hub of the assisted wheel, said bolt operating radial direction from the drum, said bolt operating mechanism comprising a gear wheel journaled on said drum and gear connection between said gear wheel and said screw bolts, and means for rotating said gear wheel.

4. An emergency wheel for a vehicle, said emergency wheel having a central drum of substantially larger interior diameter than the exterior diameter of the hub of the regular wheel of the vehicle, so that there is room for radial movement of said hub within said drum, a plurality of shoes mounted on said drum and radially movable with relation thereto, and being adapted to engage the rim of the regular wheel by positioning the rim of the emergency wheel so that said drum surrounds the hub of the regular wheel, and then moving said shoes radially outward, a crank and intermediate mechanism actuated by said crank which will move said shoes into engagement with the rim of the regular wheel.

In testimony whereof I affix my signature, in presence of two witnesses.

WILLIAM J. NOONAN.

Witnesses:
 WILLIAM A. COPELAND,
 AGNES A. HANSON.